UNITED STATES PATENT OFFICE.

OTTO RÖHM, OF DARMSTADT, GERMANY, ASSIGNOR, BY MESNE ASSIGNMENTS, TO THE CHEMICAL FOUNDATION, INC., A CORPORATION OF DELAWARE.

MEANS FOR GREASING LEATHER OF ALL KINDS AND FOR OIL TANNING.

1,414,044.  Specification of Letters Patent.  Patented Apr. 25, 1922.

No Drawing.  Application filed June 13, 1917.  Serial No. 174,642.

*To all whom it may concern:*

Be it known that I, OTTO RÖHM, a subject of the King of Wurttemberg, residing at No. 4–6 Weiterstädterstrasse, in the city of Darmstadt, Grand Duchy of Hessia, German Empire, have invented an Improvement in Improved Means for Greasing Leather of All Kinds and for Oil Tanning, and I do hereby declare that the following is a full, clear, and exact description of the same.

In tanning leather attempts have often been made to replace the expensive, and frequently adulterated, yolk of egg, which has heretofore been indispensable for tanning kid leather. Eitner proposed, instead of yolk of egg, the use of emulsions of albuminous substances, fats and oils, and Armand Müller-Jacobs proposed the use of oils treated with sulphuric acid. Both agents have been found not to be suitable substitutes for yolk of egg. The leather became hard, thin, had no "pull" and not the feeling of leather produced with yolk of egg.

It has indeed been possible to improve the action of the oils recommended by Müller-Jacobs by adding to same a volatile substance which dissolves the oil, for example a volatile hydro-carbon, acetic ester, or the like. However, with such substances the effect of yolk of egg was not obtained.

Some time ago I found that the effect of yolk of egg is not only attained, but even exceeded, if the oils which have been treated with sulphuric acid, before being used, are freed from the soap contained in same, and if the sulphuric acid-oil constituent is reduced in amount per unit volume by diluting with unaltered oil.

Now it has been found that oils that have been treated with a small amount of sulphuric acid which are easily soluble in water, and whose solution does not thicken or slightly harden by air exposure, are excellent substances for greasing leather of all kinds and for oil tanning, and that such substances can be obtained, if only that quantity of sulphuric acid is taken which gives after complete mixture of acid and oil a product that is easily soluble in water.

For example, this can be carried out with castor oil, if the treatment is effected with 0.5% to 1% sulphuric acid, whereas heretofore 10–25% sulphuric acid has been employed. The sulphuric acid is poured slowly into the oil heated to about 40° C, which is continually stirred, and after the mixture has been allowed to stand until cold and a thorough mixture is effected, the higher fatty acid constituents and other objectionable residues are removed by any well known and convenient method such as with sodium or potassium lye.

Also in oil tanning with fish oil the oils that are treated with a small amount of sulphuric acid are more suitable than the various recommended sulphonated fish oils produced in the usual way.

What I claim and desire to secure by Letters Patent of the United States is:

1. The process for preparing a tanning material which comprises mixing with an oil moderately heated, from one-half to one per cent sulphuric acid, and neutralizing the mixture with a caustic alkali.

2. An agent for greasing leather and for oil tanning, consisting of a vegetable oil embodying from about one-half to one per cent of sulphuric acid.

OTTO RÖHM.